(12) United States Patent
Barker

(10) Patent No.: US 9,984,588 B1
(45) Date of Patent: May 29, 2018

(54) METHOD FOR SHOWING A VISUAL CHANGE TO A HUMAN BODY SHAPE

(71) Applicant: Better Body Image, Inc., Pittsburgh, PA (US)

(72) Inventor: Deborah J. Barker, Pittsburgh, PA (US)

(73) Assignee: Better Body Image, Inc., Pittsburgh, PA (US)

( * ) Notice: Subject to any disclaimer, the term of this patent is extended or adjusted under 35 U.S.C. 154(b) by 0 days. days.

(21) Appl. No.: 15/052,981

(22) Filed: Feb. 25, 2016

Related U.S. Application Data

(60) Provisional application No. 62/131,427, filed on Mar. 11, 2015.

(51) Int. Cl.
| | | |
|---|---|---|
| G06K 9/00 | (2006.01) | |
| G09B 19/00 | (2006.01) | |
| G06T 11/60 | (2006.01) | |
| G06K 9/62 | (2006.01) | |
| G09B 5/02 | (2006.01) | |

(52) U.S. Cl.
CPC ..... *G09B 19/0092* (2013.01); *G06K 9/00362* (2013.01); *G06K 9/6215* (2013.01); *G06T 11/60* (2013.01); *G09B 5/02* (2013.01); *G06T 2207/30196* (2013.01)

(58) Field of Classification Search
CPC ..... A61B 5/1118; A61B 5/4872; A61B 5/743; A61B 5/107; A61B 5/7425; A61B 5/1072; G09B 19/0092; A63B 2230/75; A63B 2230/70; A63B 2230/01; A63B 2024/0065; G06K 9/00362
See application file for complete search history.

(56) References Cited

U.S. PATENT DOCUMENTS

| | | | | |
|---|---|---|---|---|
| 6,643,385 | B1 * | 11/2003 | Bravomalo | ............ G06T 11/00 345/646 |
| 8,475,367 | B1 * | 7/2013 | Yuen | ............ G06F 19/3418 128/920 |
| 8,891,839 | B2 | 11/2014 | Bravomalo et al. | |
| 2003/0108851 | A1 * | 6/2003 | Posa | ............ G09B 19/0076 434/238 |

(Continued)

FOREIGN PATENT DOCUMENTS

WO    WO 2005045748 A1 *    5/2005    ........... A61B 5/0002

OTHER PUBLICATIONS

Zhou, Shizhe, Hongbo Fu, Ligang Liu, Daniel Cohen-Or, and Xiaoguang Han. "Parametric reshaping of human bodies in images." In ACM Transactions on Graphics (TOG), vol. 29, No. 4, p. 126. ACM, 2010.*

(Continued)

*Primary Examiner* — Carol Wang
(74) *Attorney, Agent, or Firm* — Beck & Thomas, P.C.

(57) ABSTRACT

This is a method of showing to a person a visual change to his or her current human body shape. Historical data is used to show how human body shapes change in response to change in weight and measurement of the bodies. A user takes a picture of his or her current body and then selects points on the picture where change is desired in response to desired weight change. The user then views a picture of how his or her desired change will look on his or her current body shape by altering the picture using the historical data.

1 Claim, 14 Drawing Sheets

(56) References Cited

U.S. PATENT DOCUMENTS

| | | | |
|---|---|---|---|
| 2004/0131227 A1* | 7/2004 | Bravomalo | G06Q 30/0269 |
| | | | 382/100 |
| 2005/0113650 A1* | 5/2005 | Pacione | A61B 5/411 |
| | | | 600/300 |
| 2007/0135737 A1* | 6/2007 | Vastano | A61B 5/1073 |
| | | | 600/587 |
| 2013/0325493 A1 | 12/2013 | Wong et al. | |
| 2014/0043458 A1 | 2/2014 | Cha et al. | |
| 2014/0214442 A1* | 7/2014 | Duffy | G06F 19/3418 |
| | | | 705/2 |
| 2014/0289270 A1* | 9/2014 | Jafarifesharaki | H04L 67/42 |
| | | | 707/769 |
| 2014/0348417 A1* | 11/2014 | Moore | A61B 5/1075 |
| | | | 382/154 |
| 2015/0037771 A1* | 2/2015 | Kaleal, III | G09B 5/02 |
| | | | 434/257 |

OTHER PUBLICATIONS

Xi, Pengcheng, Hongyu Guo, and Chang Shu. "Human body shape prediction and analysis using predictive clustering tree." In 3D Imaging, Modeling, Processing, Visualization and Transmission (3DIMPVT), 2011 International Conference on, pp. 196-203. IEEE, 2011.*

* cited by examiner

FIG. 1: Sample Historical Data Card

VITALS
Height: 5' 4"  Weight: 168
Pulse: 76/min  Age: 38  BP: 120/80
BMI/BFA: 28%  Activity Level: moderate

AEROBIC DATA
Treadmill Test: 10 mins.
HR: 140  RR: 120
HR: _____  RR: _____
HR: _____  RR: _____
HR: _____  RR: _____

MEASUREMENTS

| Date: | 9/12 | 10/18 | 11/30 | ← ARMS (Ref 54a, 54b) |
| Arm: | 11¾ 11½ | 11¾ 11¾ | 11½ 11½ | ← CHEST (Ref 56) |
| Chest: | 42 | 42¾ | 43 | ← WAIST (Ref 58) |
| Waist: | 34 | 37 | 36 | ← ABDOMINALS (Ref 60) |
| Abd: | 37¾ | 44 | 42 | ← HIP (Ref 62) |
| Hip: | 42 | 44½ | 44 | ← THIGHS (Ref 64a, 64b) |
| Thigh: | 24 23½ | 26 26 | 25 25 | |
| Notes: | 168 | 154½ | 146 | ← WEIGHT (Ref 66) |

Dee Barker
1720 Washington Road, Suite 201

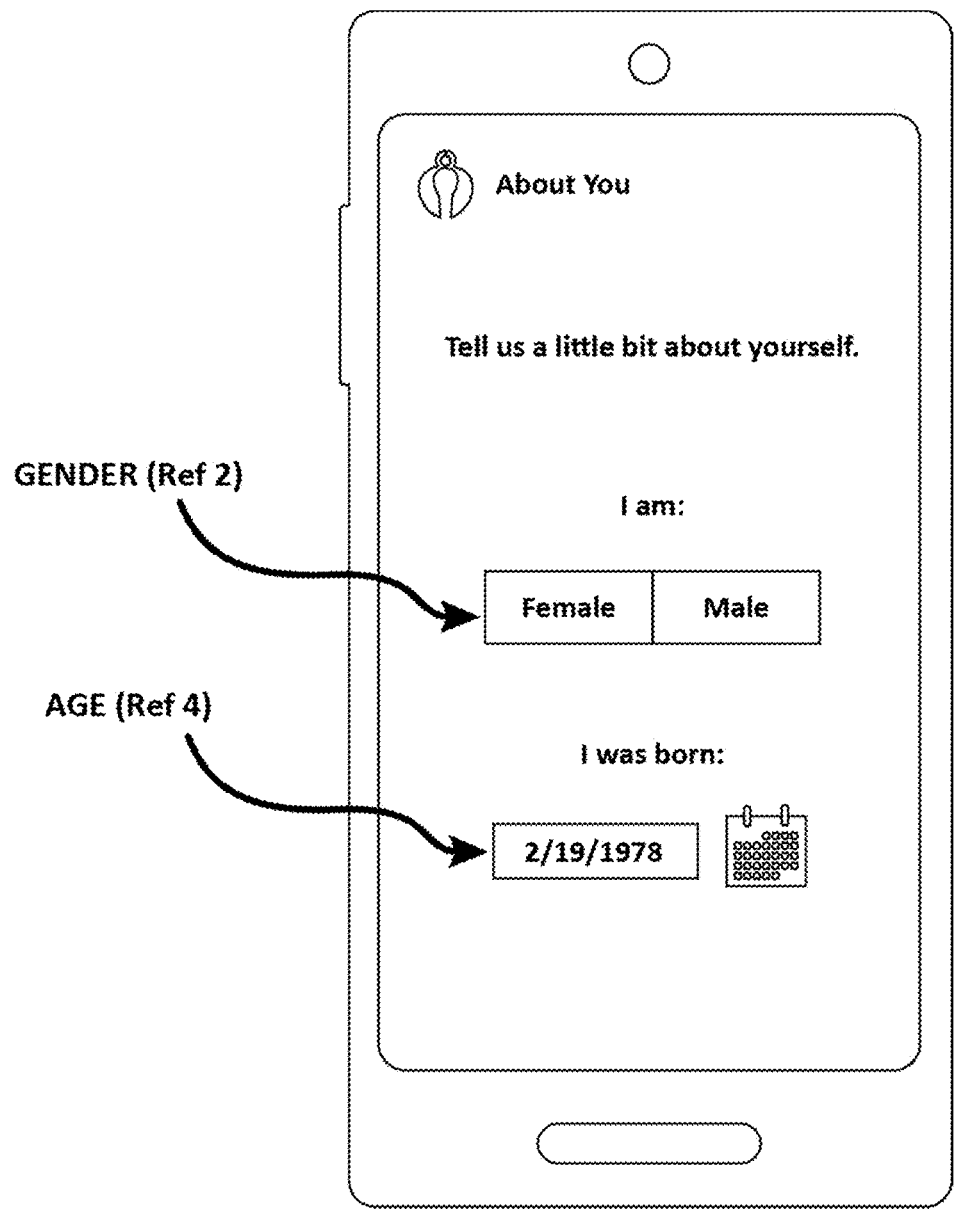
FIG. 2: Sample Entry Screen for Gender and Age

FIG. 3: Sample Entry Screen for Height, Weight, and Waist Measurement
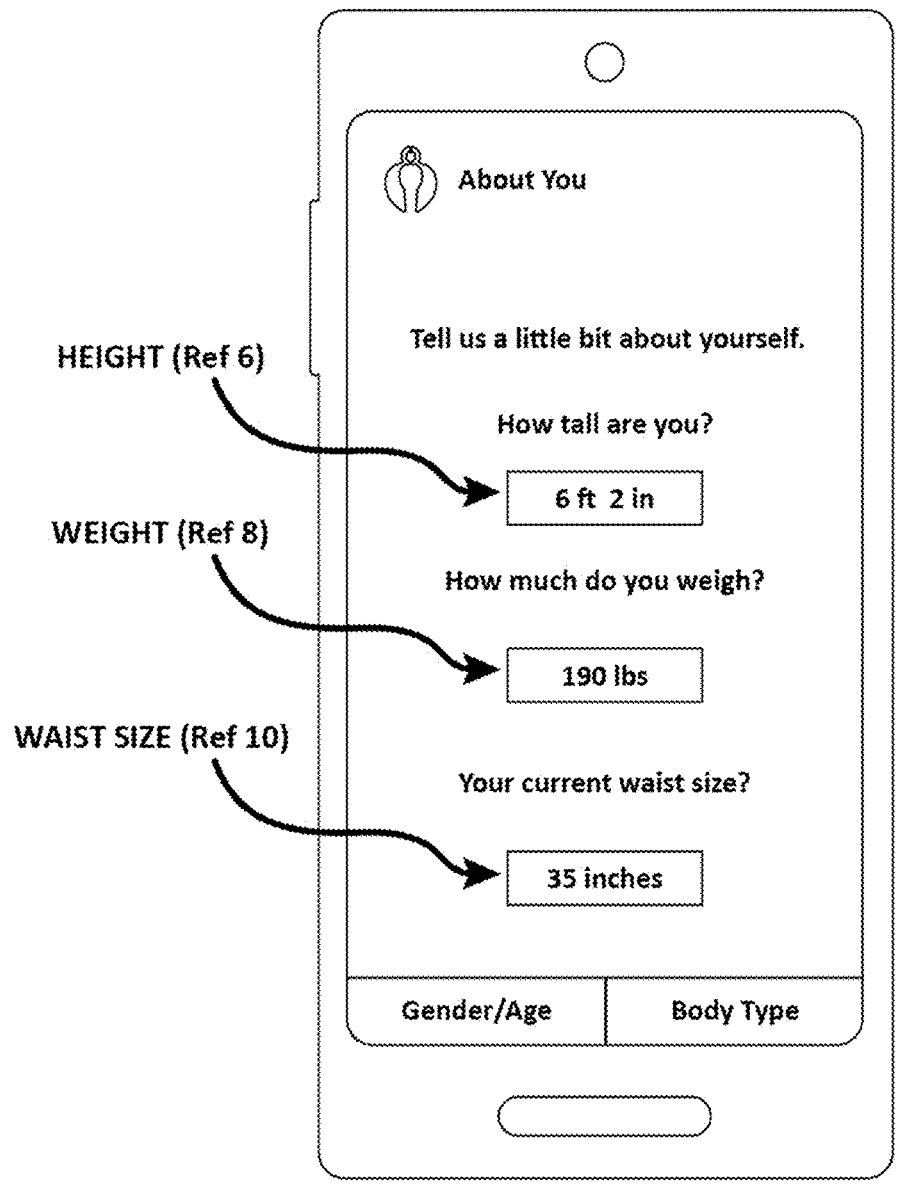

FIG. 4: Sample Activity Level Screen
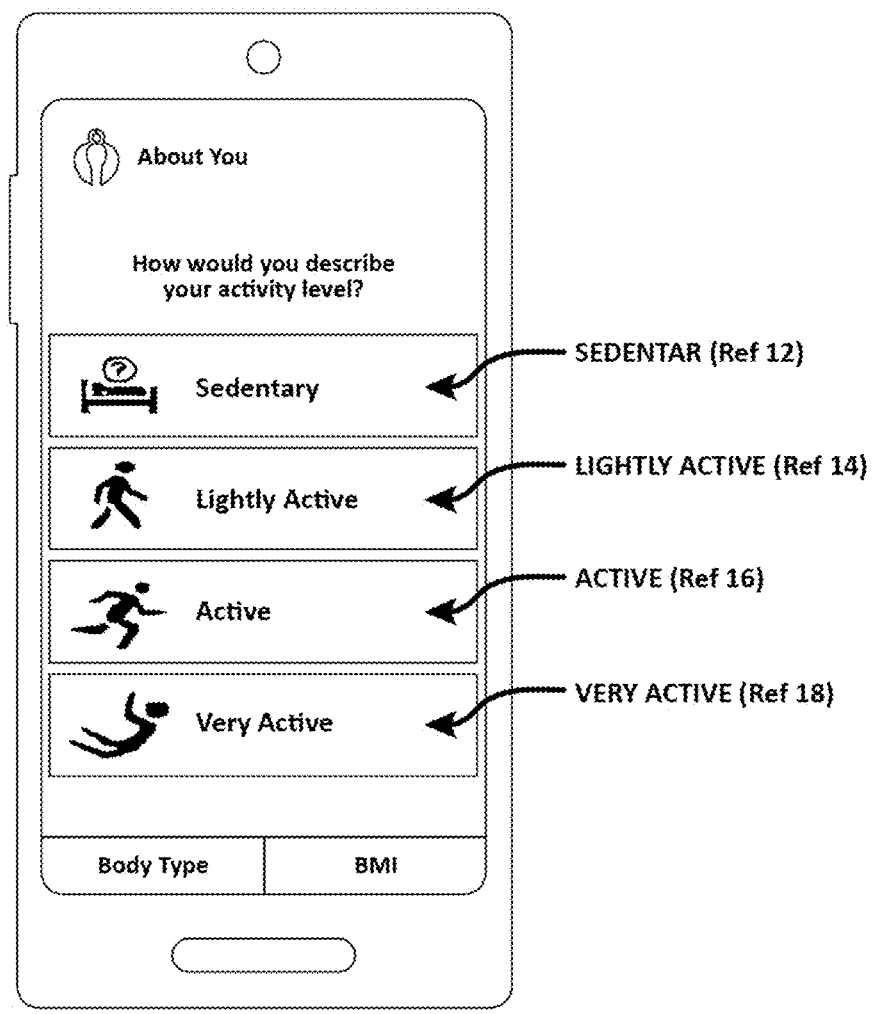

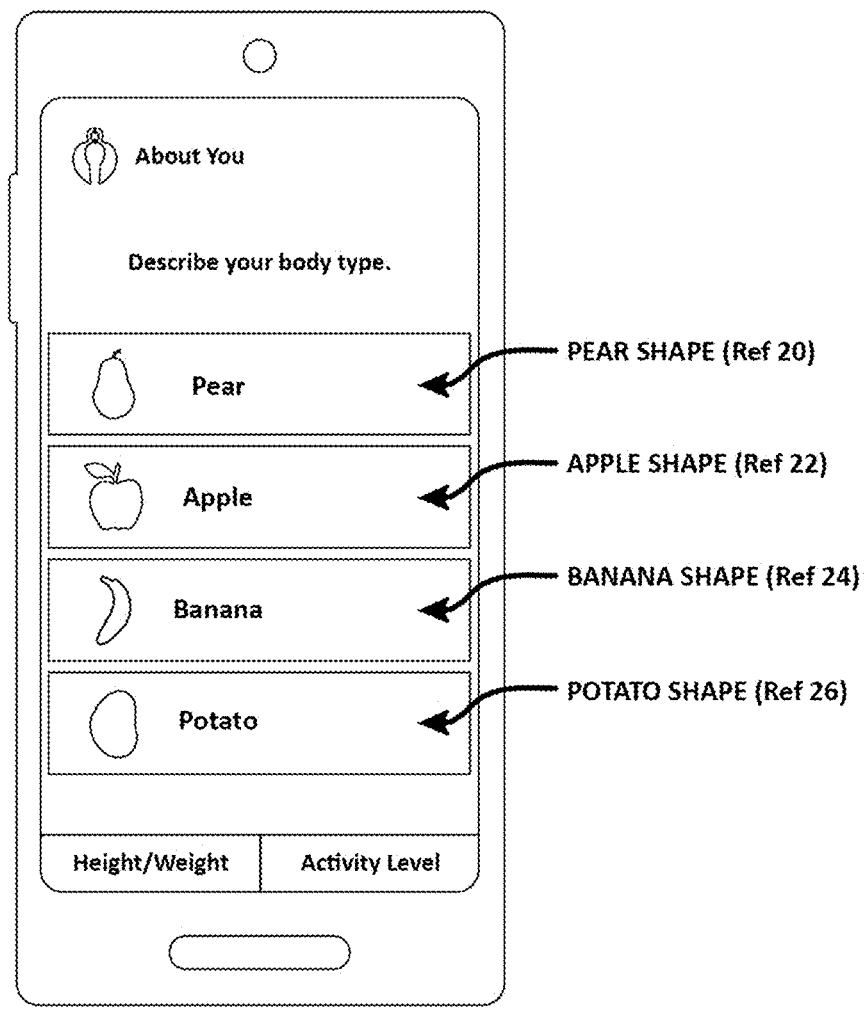
FIG. 5: Sample Body Shapes Screen

FIG. 6: Sample Basal Metabolic Rate (BMR) Screen
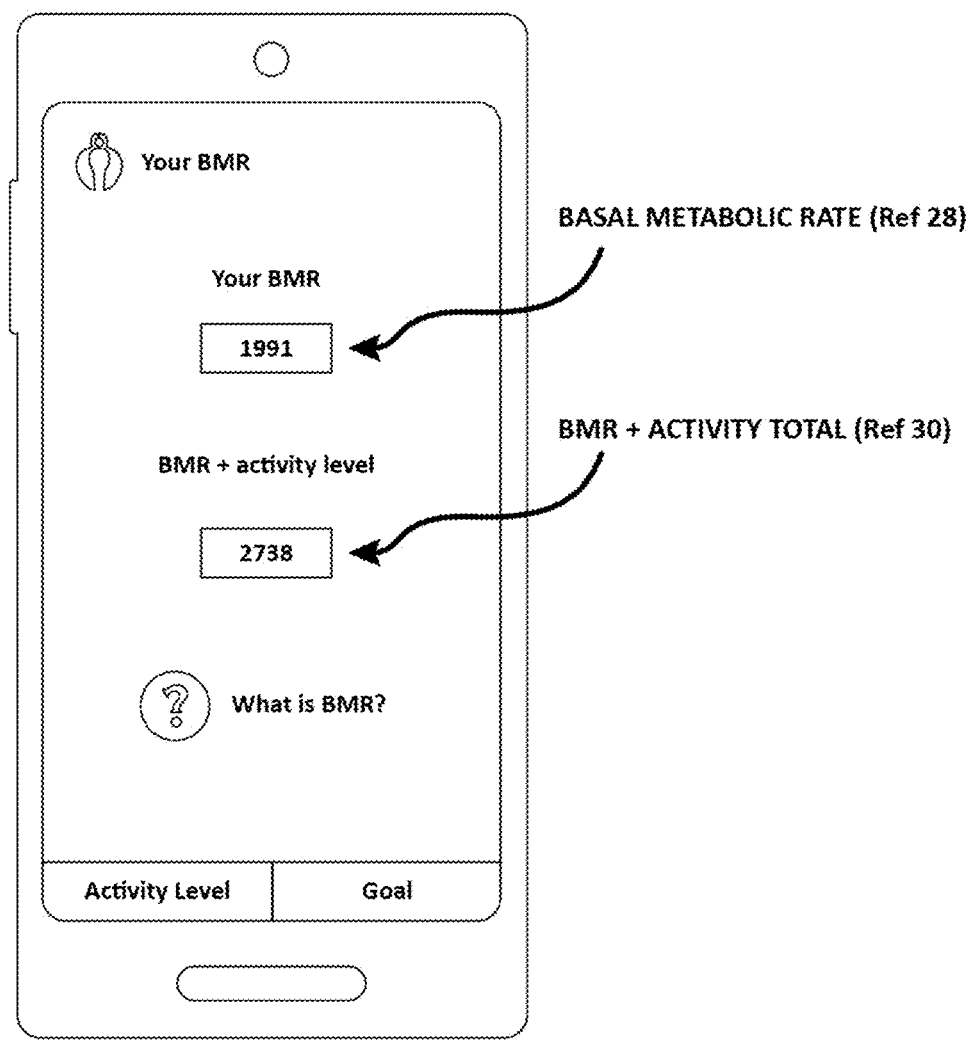

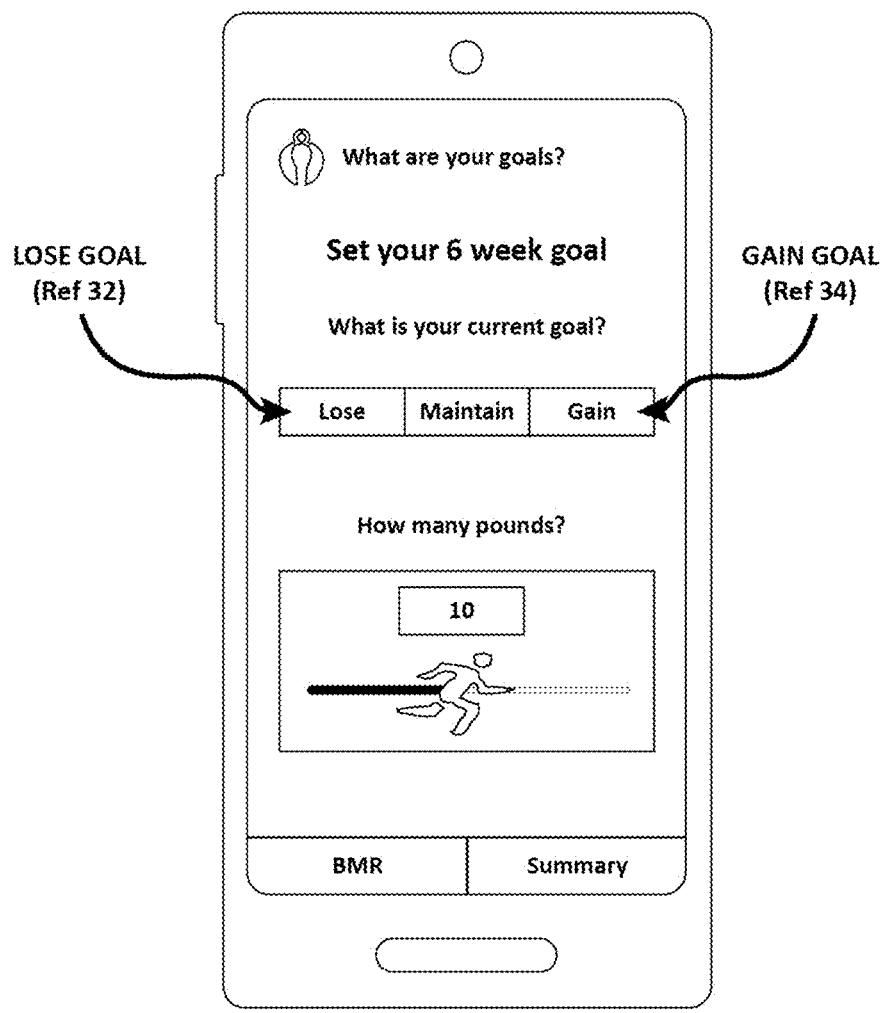
FIG. 7: Sample 6-Week Goal Setting Screen

FIG. 8: Sample Picture Prompt Screen
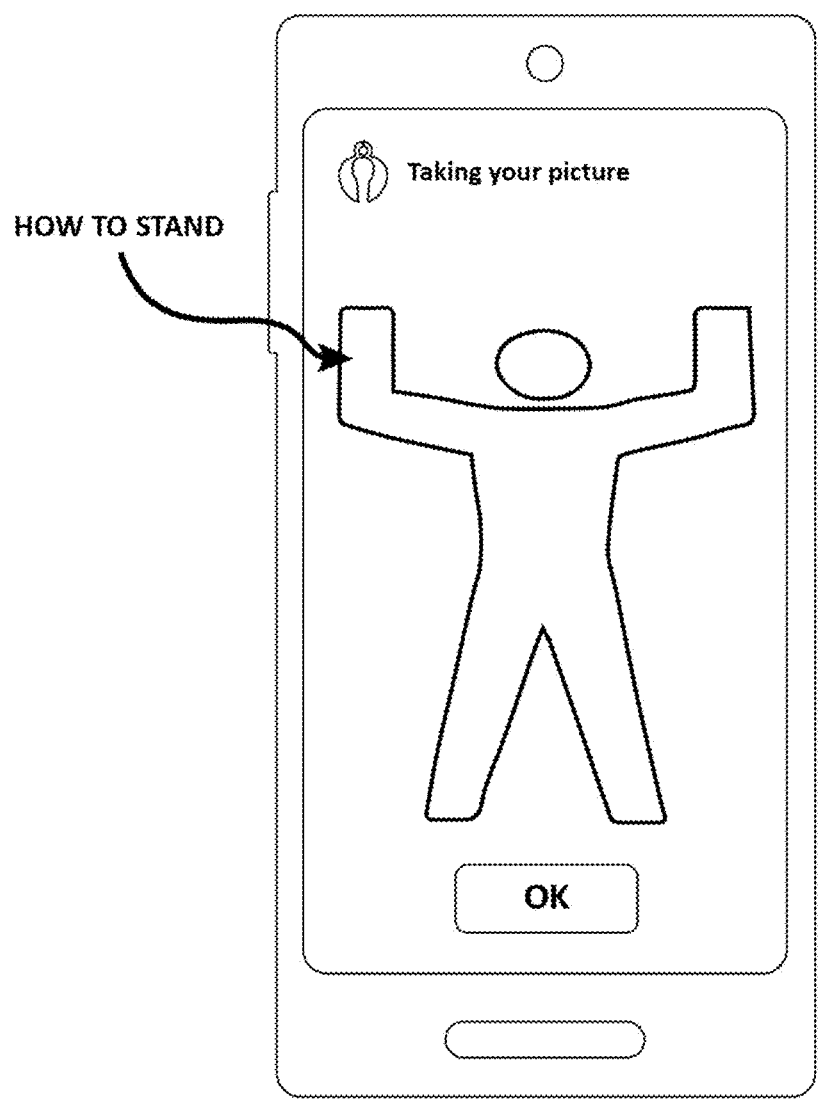

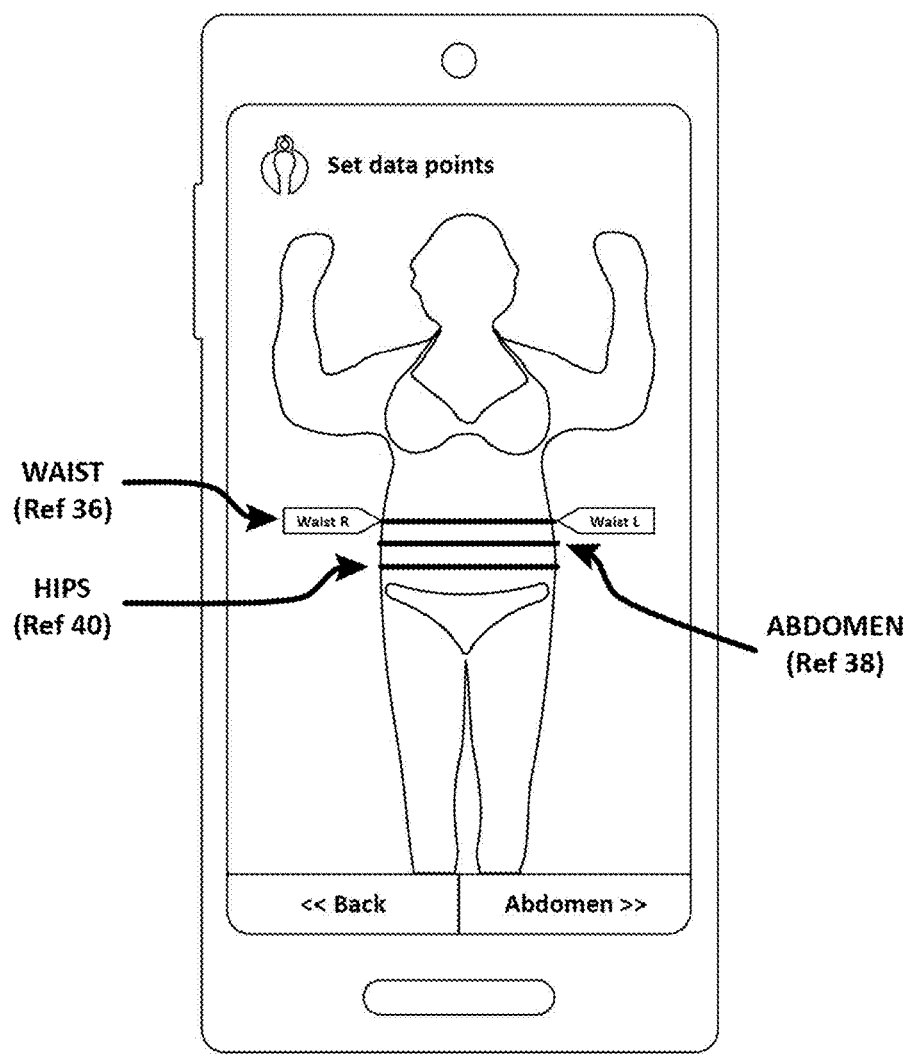
FIG. 9: Sample Screen Showing the Setting of 3 Data Points

FIG. 10: Sample Database Record

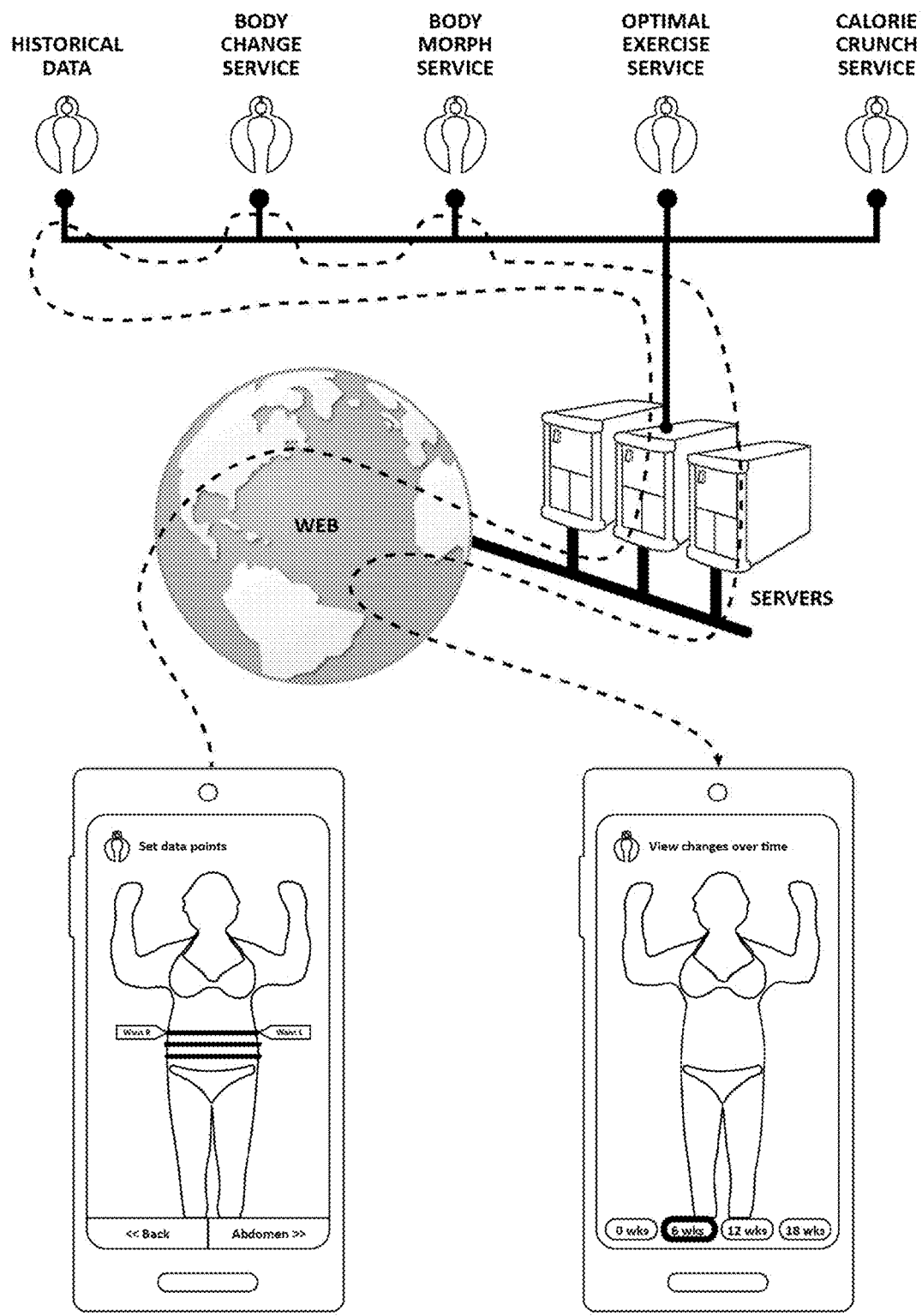
FIG. 11: Morphing Process Diagram Showing Data Routing

FIG. 12: Sample Screen Showing Morphed Photo Indicating Potential Change at 6 Weeks
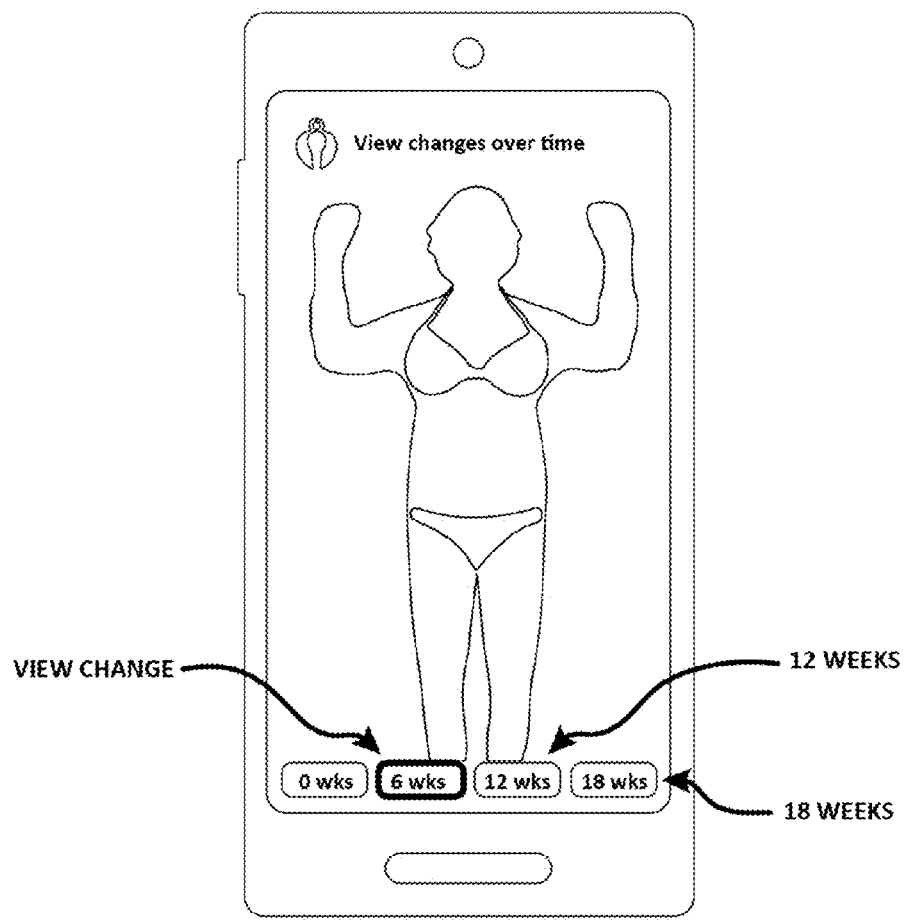

FIG. 13: Sample Screen Showing Morphed Photo Indicating Potential Change at 12 Weeks
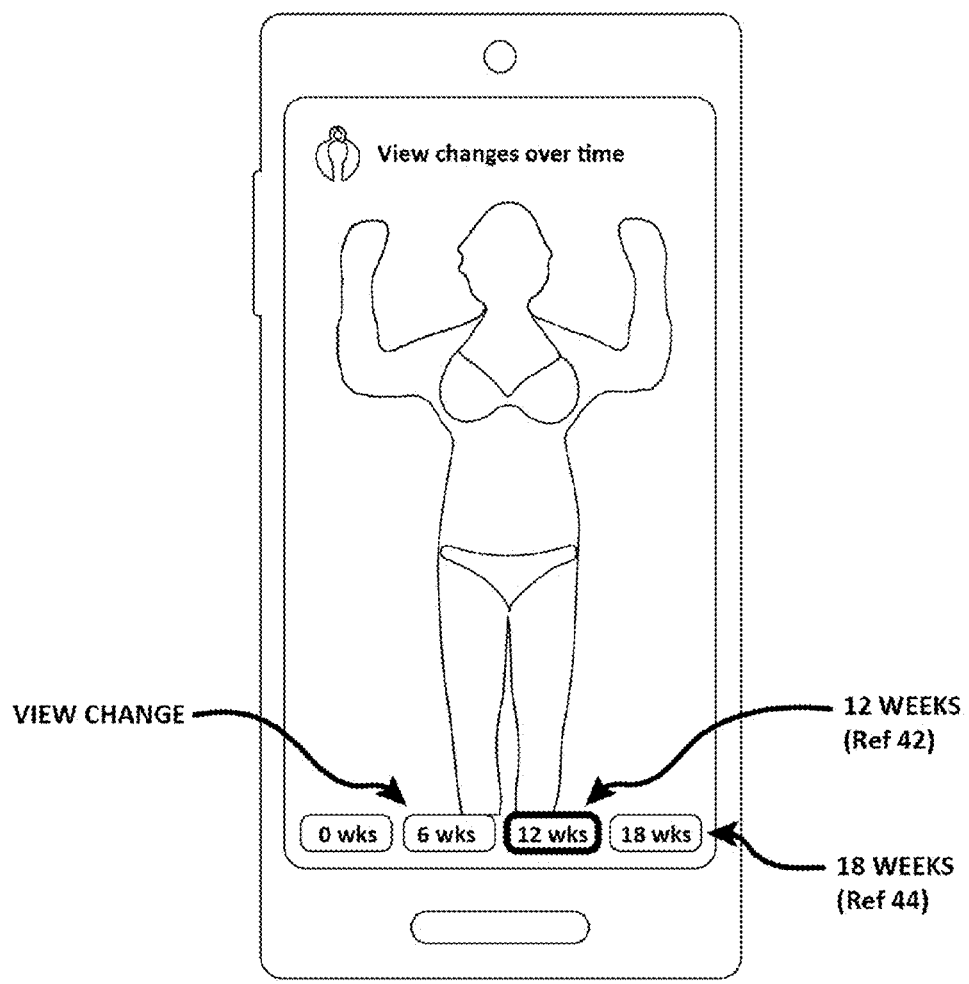

FIG. 14: Four Basic Body Types of Men and Women
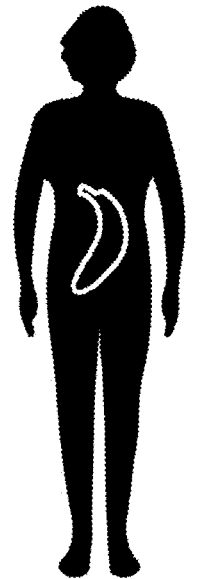
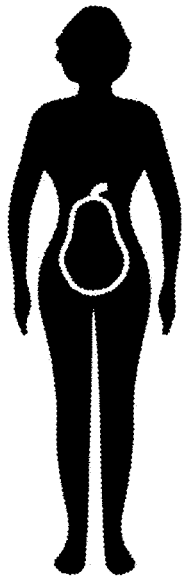
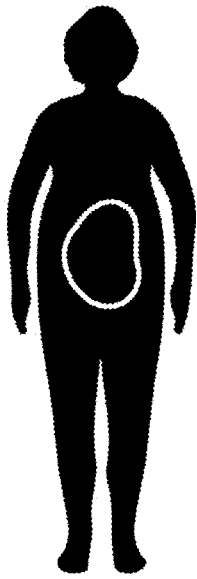
BANANA SHAPE (Ref 48)     PEAR SHAPE (Ref 50)     APPLE SHAPE (Ref 46)     POTATO SHAPE (Ref 52)
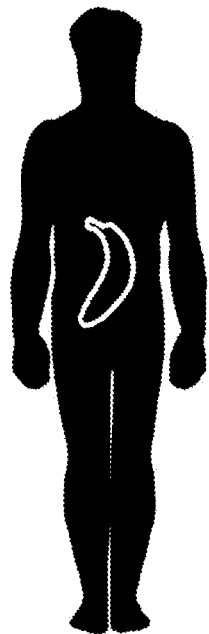
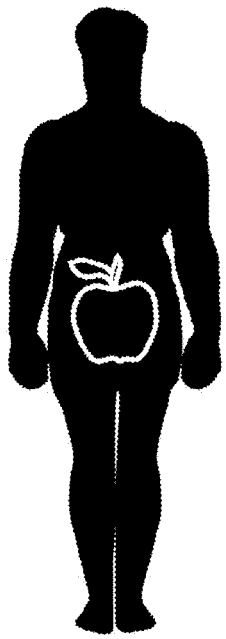
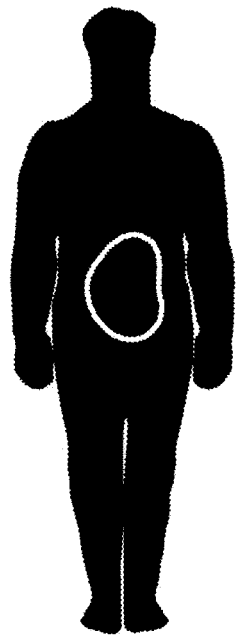

METHOD FOR SHOWING A VISUAL CHANGE TO A HUMAN BODY SHAPE

CROSS-REFERENCE TO RELATED APPLICATION:

This Application claims the benefit under 35 U.S.C. § 119(e) of the earlier filing date of U.S. Provisional Patent Application Ser. No. 62/131,427, filed on Mar. 11, 2015 which is incorporated by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIALS SUBMITTED ON A COMPACT DISC

Not Applicable

BACKGROUND OF THE INVENTION (a) Field of the Invention

The invention relates to a user to see how his or her particular current human body shape would change with weight change. A picture is taken of the user's current body. Parts are selected on the body in the picture where change is desired in response to a desired weight change. Then changes are projected to the current human body image. This is accomplished by altering the picture based on pre-existing data on how body shape changes in response to weight change.

(b) The Problem the Inventor Addressed

According to statistics in 2013, 40 million people in the United States tried to lose weight. More than 70% failed. Of those who succeeded, 10% gained their weight loss back after one year. The biggest issue in the health and wellness industry is attrition.

Most weight loss programs deal with how to motivate individuals to get started on a health or weight loss program. However, most do not address the issue of retention and motivation.

Individuals are desperate for quick weight loss programs. They fall into a false assumption that a healthy fit body can happen in a short amount of time. They have an unrealistic expectation of what they can achieve and how it will look with their body shape. This leads to attrition that is a problem in the health and wellness industry. Individuals stay focused on goals and then fall off their health and weight loss course because they set unrealistic goals first, and then do not see results fast enough. Over 45% of Americans tried to lose weight in 2013. 38% failed and are now more out of shape and overweight, making their problem bigger.

The population needs to be educated realizing that there is a more realistic approach to body changes to losing weight. Many individuals go from one failed weight loss plan to the next spending thousands of dollars on a program that may yield quick results but not lasting.

Making lifestyle changes is the proven key to long-term success and the way this happens is for the individual to stay focused on his or her goals for a long enough time that he or she can begin to feel and see results. That is when the behavior begins to change. When results are achieved due to lifestyle changes, the individual is more likely to stay on course because he or she has slowly integrated the changes and remained focused. The individual will begin to feel better and have more energy. The end result is that the participant will begin to feel worse when they have not exercised or eaten right because their body has now grown to like the healthier lifestyle. This result is an overall lifestyle change.

(c) Description of the Related Art

U.S. Pat. No. 8,891,839, issued Nov. 18, 2014 [patent '839] is an example of art that attempted to solve the problem. It is a computer-implemented method of creating indications of health risk and personal appearance for a person. Users begin by entering their current measurements, measurement goals, and current picture into the system, preferably by a website. The picture is segmented into body components, and each affected segment is morphed based upon the measurements, goals, and segment's responsiveness to weight loss in order to create a modified image representative of the use and a post-regimen condition.

The system analyzes the user's data and produces a customized fitness plan by applying a morphing process to the "before view." The picture is sectionalized into body components which are highly responsive to weight loss and components which are less responsive to weight loss, and the amount of change in each body section is determined by a physiological tables and formulae. The resulting modified "after view" image is then returned to the user, preferably by online communications.

By showing members how they will look ten pounds thinner and giving them a plan on how to achieve it will generate a satisfied and loyal clientele. [Col. 3; ls. 48-82].

Patent '839 uses a fitness "profiler". Users must enter into a website their measurement goals and a current picture. This system analyzes the user's data and produces a customized fitness plan to produce a "before view". The picture is sectionalized into body components which are responsive to weight loss and components which are less responsive to weight loss and the amount of change in each body section is determined by physiological tables and formulae. The resulting modified "after view" image is then returned to the user. [Col. 3; ls. 15-30].

The combination of three-dimensional morphing technology with mathematical statistics is used to project that loss and muscle gain and to produce projected fitness out-comes. The user's input data preferably includes skin fold, circumference, height, weight, BMR, and activity level. By entering the client's measurements into a mathematical formula, the user's picture can be morphed into the desired outcome. The combination of skinfold and circumference measurement produces an accurate morphing outcome for each user. [Col. 3 ls. 20-41]. A problem with this method is that most individuals especially those not versed in human physiology are not able to supply the exact or even correct information requested in order to produce a true image of the individual's body. The method is one image and does not supply additional images to show a body shape change beyond the original goal.

The collected data is problematic because Applicant's studies show that the population does not know specific body measurements or even how to measure. Every individual has the opportunity to measure differently. There is a large differentiator if someone else is measuring or the individual is measuring himself or herself. The technology used to segment the body components and analyze fat and weight loss is based upon a mathematical formula [Col.6; ls. 1-5].

(d) Inventor's Improvement ["Invention"] to the Existing Technology

The invention is based on clinically collected historical data of all body shapes, heights, weights, genders and all age groups. Individuals were measured at the site of an exercise or diet program. Eight data points were collected: two arms; chest; waist; abdomen; hip; and two thighs. They were re-collected every 10 visits or 6 weeks from the participating individuals for as long as the individuals continued in the program. This time period ranged from several months to several years. Results in weight loss, weight gain, muscle loss, muscle gain, and measurement change were all recorded for each individual by measuring the same data points for 15 years to the present by one individual. The data encompasses many thousands of data points. The data concluded that there are essentially four body types which are common and 99% of all body shapes fell into the four collected body shapes.

This historical data allows any individual to take a current picture in real time of himself or herself, set a realistic six week goal of weight loss or gain, and visually see (based upon thousands and eventually, in the future, millions of recorded body shape changes which match their particular body shape) how their body shape will look with set goal of weight loss or gain.

The invention shows that specific body shapes will gain or lose in the same ways. This calculation is based on collected data not a mathematical formula.

Included in the historical data are exercise and diet regimens that affected the outcome of the body shape changes. These results are also reflected in features of the invention.

The invention does not ask for the individual user's measurements yet supplies the measurements based on information from the picture of the individual user.

The invention collects and compares data collected results to actual results by taking another picture of the individual user at the end of a six week period. In the event that the individual user loses weight or gains weight then the invention will compare those results to projected results so that the invention learns the individual user's body and how changes occur in relation to weight loss or gain for their body shape.

This invention allows for on-going motivation for the individual user as he or she can continue to see change as his or her goals are re-set.

The invention's re-occurring data collection allows for a broader and more adequate change prediction throughout the entire population of the world.

The real data collected from the invention will also give a more accurate level of health risk along with decreased health risk by capturing real measurements of each body part in particular waist measurements.

Using collected real body data is an improvement in analyzing how a user will look with weight or measurement change than mathematical formulas. The invention is an improvement as it relates to motivating an individual use to stay focused on their health and wellness goal.

Algorithms have been created that can apply this data to a current picture which is also an improvement to a computer generated image offered by the related art.

BRIEF SUMMARY OF THE INVENTION

This is a method of showing to a user a visual change to the current human body shape of the user by applying historical data on how human body shapes change in response to change in weight and measurements of the bodies. A desired weight change of the user's current human body is selected. A picture of the user's current body is taken. Points are selected on the picture of the current user's body shape where change is desired in response to a desired weight change. The user views a new picture of how the desired change will look on the user's current body shape by altering the picture using the historical data.

This is a method of enabling a user to see a visual change to a current human body shape of a user; providing historical data on how human body shapes change in response to change in weight and measurements of the bodies; accepting a weight change input regarding a desired weight change of the user; accepting a picture of the user's current body, where the picture of the user's current body includes information about the user's current body shape; accepting a body change input that includes points on the picture of the user's current body where change is desired in response to the desired weight change; modifying the picture of the user's current body using the historical data to produce a picture of the user's future body based on the desired weight change and body change input; providing a new picture of the user's future body.

BRIEF DESCRIPTION OF THE DRAWINGS

Further aspects of the present disclosure together with additional features contributing and advantages will be apparent from the following description of embodiments of the disclosure, which are shown in the accompanying drawing figures wherein:

FIG. 1 shows how the historical data was collected on a card.

FIG. 2 shows a mobile device screen for entering a user's gender and age.

FIG. 3 shows a mobile device screen for entering a user's height, weight, and waist size.

FIG. 4 shows a mobile device screen for prompting a user to identify how active he or she is based on exercise or activities.

FIG. 5 shows a mobile device screen for prompting a user to identify where his or her body shape stores the most fat. This uses the examples of a pear shape, apple shape, banana shape, or a potato shape.

FIG. 6 shows a mobile device screen to show a user's BMR (basal metabolic rate based on how much energy [it's calories] are needed at complete rest).

FIG. 7 shows a mobile device screen to prompt a user to choose his or her goal as weight loss or weight gain.

FIG. 8 shows a mobile device screen to prompt a user to stand against a clear or unobstructed background and either have someone take a picture of his or her current body shape or he or she can take a picture of himself or herself.

FIG. 9 shows a mobile device screen for a user to identify his or her waist, abdomen, and hips of his or her current body shape picture. These indicate where the user would like to see body shape change.

FIG. 10 shows a screen on a device where historical data has been entered and stored.

FIG. 11 is a diagram showing the server where historical data is applied to a current picture of the user's body shape then is stored and returned to the user for review.

FIG. 12 shows a screen on a device that shows a future picture of the user's current body shape which has been morphed/altered to show the user how their body will change if he or she maintains prescribed exercise/diet plan and loses his or her goal weight and inches.

FIG. 13 shows a screen on a device that shows how a user's body will change if he or she continues to set the same goal of weight loss or gain over various periods of time.

FIG. 14 shows four body types. Each body type shows weight-loss patterns that are predictable by body type.

DETAILED DESCRIPTION OF THE INVENTION

This invention method is based on historical data collected over a fifteen year period of time (FIG. 1). This data included an individual's physiological information. FIG. 1 shows how the historical data was collected. Using a personalized program card the individual's physiological information was obtained and recorded onto the program card. This physiological information included current: height; weight; resting pulse; age; blood pressure; activity level; nutritional information; cardiovascular condition as it pertained to recovery rate; right arm measurement 54a; left arm measurement 54b; chest measurement 56; waist measurement 58; abdominal measurement 60; hip measurement 62; right thigh measurement 64a; and left thigh measurement 64b.

Recurring measurements and weight changes were taken every six weeks.

The method requires the use of mobile device (preferred) or internet, where all the information is entered and stored.

Users are asked to complete a self-evaluation on a mobile device or internet. FIG. 2 shows where specific physiological information pertaining to gender 2, and age 4 are entered. Users will then input their height 6, weight 8, and waist size 10 (FIG. 3).

Users are asked to select how active they are by viewing pre-determined activity levels based on definitions of exertion from the ACSM (American College of Sports Medicine) activity guidelines. This includes: sedentary 12, lightly active 14, active 16, and very active 18 (FIG. 4).

Users will be asked to determine the body shape that best describes their body from the profile/outline of four specific body shapes that have been determined from the collected historical data (FIG. 1). The user may be a pear shape 20, an apple shape 22, a banana shape 24, or a potato shape 26. These are also shown in FIG. 14 as apple 46, banana 48, pear 50, and potato 52.

Pear shape 50, stores fat in the lower portion of the body shape, hips, and thighs, and has a proportionally smaller upper body.

Apple shape 46, stores fat in the mid-section of the body around the waist and abdominal area, with proportionally smaller legs and chest.

Banana shape 48, does not tend to store fat and is linear where there is little proportion size between shoulders and hips.

Potato shape 52, stores fat all over and usually contains higher percentages of muscle mass. The potato shape 52 does not have clearly defined proportions where large proportions are all over.

Based on the user's basal metabolic rate (BMR) 28, a formula (Harris-Benedict the most notable, created in 1919, and revised in 1965) is the minimal amount of energy required when the body is at complete rest (FIG. 6).

The BMR is added to the selected activity level 30 (a formula which determines how many calories are needed per unit of energy provided by the ACSM). The user views how many calories are required per day for the specific user (FIG. 6).

Users are prompted to select a six week goal of weight loss 32, or weight gain 34, (FIG. 7).

Next, the user is prompted to take a current picture/image of himself or herself in real time (FIG. 8). The current picture is then recorded and displayed on a device (FIG. 9). The user isolates a plurality of data points—36 waist, 38 abdomen, 40 hips, on the picture (FIG. 9). This is just an example of plurality of points.

The current picture/image of the current human body shape (FIG. 9) is then sent to a server (FIG. 11) where the historical data (FIG. 1) is stored and the algorithms created from the historical data of how specific human bodies shape change in response to changes in weight and measurements.

The goal data will then be applied to the picture/image of the current human body shape (FIG. 9) and altered, then returned to the mobile device or internet in real time so that the user can see within seconds how his or her current human body shape will look (FIG. 12).

The user can then view how his or her altered human body shape (FIG. 13) will change and look over time in additional 12 week intervals 42, and 18 weeks 44, (FIG. 9), based on the collected historical data (FIG. 1).

The invention will include a prompt notification at the end of the six weeks for the user to take another picture and compare the first picture/image prediction (shown in FIG. 9) to a new actual picture/image to allow a system to continually learn and predict the user's specific body shape changes (FIG. 13).

Figure 10:
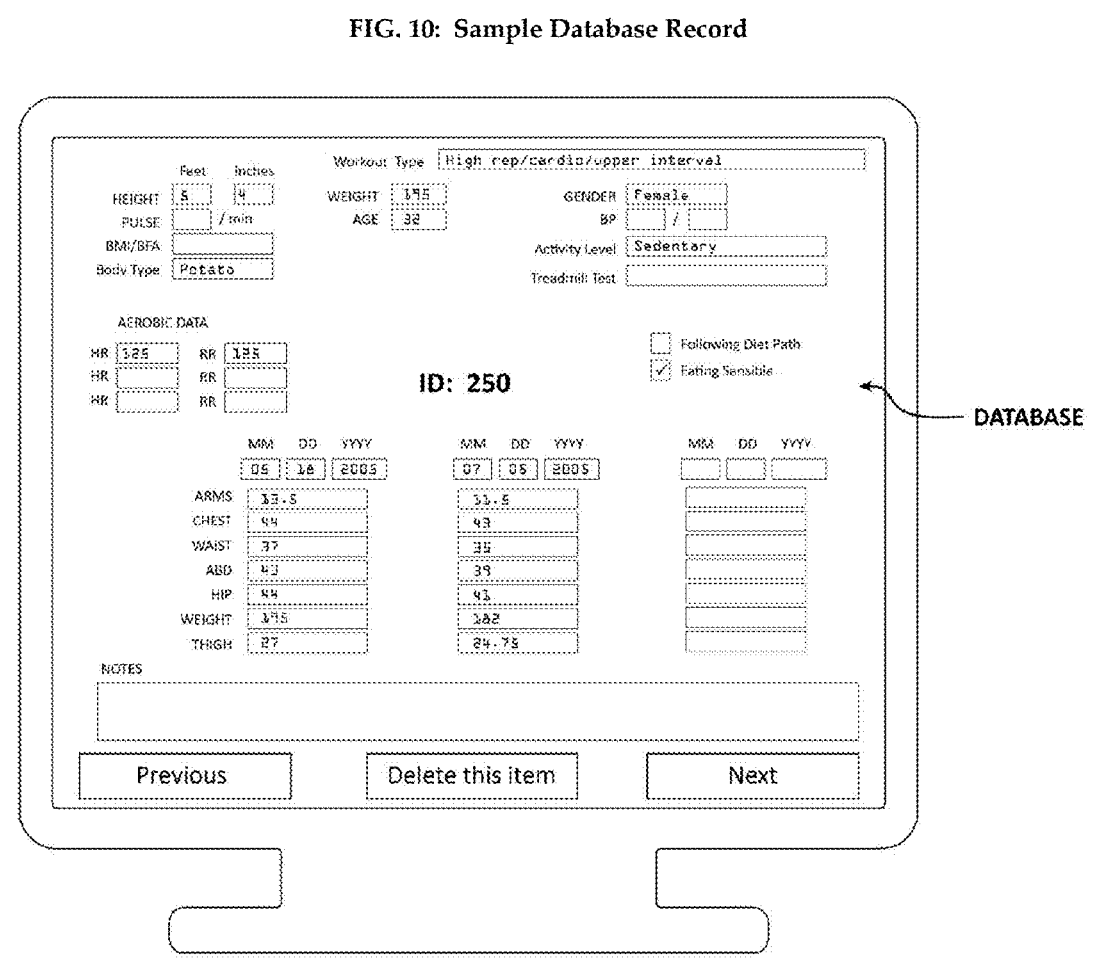

The method will continue to collect existing current human body shapes (FIG. 9) along with the altered body shapes (FIG. 12). These shapes will be added to the data (FIG. 10) to further perfect the algorithms and continue to collect data on how human body shapes change in response to exercise, change in measurements, and change in calories.

The method will be used by any person wishing to set realistic goals and view how those goals would look in real time on his or her human body shape (FIG. 12).

The method also relates to any person who may be advised to keep his or her waist size below a certain measurement to avoid potential medical conditions such as type 2 diabetes or heart disease.

The method relates to the issue of attrition in the health and wellness industry and can be used by health and wellness coaches to assist and motivate their clients to set realistic goals and remain focused on those goals.

The method relates to professional athletes and coaches who need to obtain a desired body shape within a designated period of time as a realistic approach to what those changes will look like on the current human body shape.

The method relates to the issue of body dysmorphia as it will show a real picture/image of the user's current body shape and instill that losing too much weight can negatively impact the user's physical appearance and health. The user can view that he or she looks physically better with weight gain vs. weight loss.

The method relates to the issue of special needs users who can relate to a current picture/image of themselves at a healthier weight and measurement change. This population may not be able to navigate or understand current health and wellness tools, but would be able to view a picture/image where they can view themselves with weight loss and measurement change.

Data

The data was collected from individuals participating in a prescribed exercise/diet or exercise only, or diet only program. The data was collected over a fifteen year period and stored (FIG. 10). The data consists of both male and female, ages 8 to 78.

All participating individuals were asked to make a 6 week goal referring to physiological and psychological changes they would like to accomplish (FIG. 1).

Body shape observations were made and distinguished where the participant gained the most fat. These body shapes were given specific names to help identify their specific body shape (FIG. 14).

A banana shape 48, is described as a linear body shape with symmetrical points from shoulder to hips. This body shape tended to not store fat specifically in one area (FIG. 14).

A pear shape 50, is described as a body shape that gained more fat in the hip and thigh area of the body (FIG. 14).

A potato shape 52, is describes as a body shape with more than average muscle mass and gains fat all over as opposed to one specific area of the body shape (FIG. 14).

An apple shape 46, is described a body shape that gains/stores more fat in the mid-section of the body, specifically the waist and abdomen. It is especially high risk to store fat in this area as the fat is the closest to the heart, therefore keeping focused on weight loss in this area particularly can reduce health risk such as Type 2 diabetes and heart disease.

Measurements were taken from a plurality of 8 data points by Dee Barker who supervised the program. The data points consisted of: right arm biceps circumference 54a; left biceps circumference 54b; chest circumference 56; waist circumference 58; abdominal circumference 60 (which was measured at 2" below participants' navel); hip circumference 62; right thigh circumference 64a; left thigh circumference 64b; and weight 66 (FIG. 1).

All measurements along with a prescribed exercise program and goals were recorded on the participant's individual program card.

It was noted on the program card whether the individual was following a specific diet plan or just eating sensibly.

If the participant's goal was to lose weight, the participant, the BMR, and activity needs were evaluated and the participant was advised to decrease caloric intake by 200 calories per day.

A re-evaluation was scheduled for approximately six (6) weeks from the current date and every six weeks consecutively.

All participants were supervised throughout the duration of their exercise programs.

I claim:

1. A method for viewing an image of a predicted visual change to a user's current body shape comprising:
    a) manually measuring specific areas on a human body from a plurality of individuals having various body shapes, heights, weights, genders, and ages over a time frame in response to changes in weight;
    b) classifying the various body shapes of the plurality of individuals into a predetermined number of body shape categories;
    c) storing the measurements and classified body shape category of each individual in a database;
    d) acquiring an image, with a camera, of the user's current body shape;
    e) determining a body shape category for the user's current body shape;
    f) selecting a desired weight for the user's current body shape;
    g) modifying the image of the user's current body shape by predicting a visual change to the user's current body shape at the desired weight based on the determined body shape category for the user's current body shape and how the measurements of the plurality of individuals changes in response to changes in weight for the determined body shape category;
    h) acquiring a new image of the user's body shape at a future time and comparing the new image of the user's body shape with the modified image of the user's current body shape to learn how the user's body changes in response to a change in the user's weight and refine the prediction.

* * * * *